United States Patent [19]

Tomikawa et al.

[11] Patent Number: 5,405,595
[45] Date of Patent: Apr. 11, 1995

[54] PROCESS FOR THE DISPOSAL OF CARBON DIOXIDE

[75] Inventors: Fumio Tomikawa; Masaki Iijima, both of Tokyo, Japan

[73] Assignee: Mitsubishi Jukogyo Kabushiki Kaisha, Tokyo, Japan

[21] Appl. No.: 999,453

[22] Filed: Dec. 29, 1992

Related U.S. Application Data

[63] Continuation of Ser. No. 712,686, Jun. 10, 1991, abandoned.

[30] Foreign Application Priority Data

Jun. 22, 1990 [JP] Japan .................................. 2-162740

[51] Int. Cl.$^6$ .......................... C01B 31/20; F25J 1/00
[52] U.S. Cl. ........................................ 423/659; 62/9; 62/53.1; 423/220; 423/437 R; 588/250
[58] Field of Search ............ 423/437 R, 220, DIG. 20, 423/659; 422/4; 62/53.1, 121, 531, 8, 9, 10, 1; 60/641.7; 405/52; 165/45; 588/250

[56] References Cited

U.S. PATENT DOCUMENTS

| 3,975,167 | 8/1976 | Nierman .................................. 62/10 |
| 4,239,510 | 12/1980 | Hays et al. ............................ 55/215 |

FOREIGN PATENT DOCUMENTS

| 45102 | 11/1888 | Germany . |
| 3924908 | 1/1991 | Germany . |
| 1-094916 | 4/1989 | Japan ...................................... 55/68 |
| 2-080316 | 3/1990 | Japan ...................................... 55/68 |
| 2-133308 | 5/1990 | Japan ........................... 423/DIG. 20 |

OTHER PUBLICATIONS

Baes, C. F., et al., "Options for the Collection and Disposal of Carbon Dioxide", Oak Ridge National Labs document ORNL-5657, published May 1980 (Baes I).

Baes, C. F. et al., "The Collection, Disposal, and Storage of Carbon Dioxide", NTIS document CONF-8003-09-4, published 1980 (Baes II).

Steinberg, M., et al., "Systems Study for the Removal, Recovrey, and Disposal of Carbon Dioxide from Fossil Fuel Power Plants in the U.S.", U.S. Department of Energy Document #DOE/CH/00016—2, Dec. 1984.

Chemical Abstracts, vol. 104, #115231j (1986).

Kirk-Othmer, "Encyclopedia of Chemical Technology", 3rd Ed., vol. 4, New York: Wiley, (1980), pp. 737–786.

Primary Examiner—Michael Lewis
Assistant Examiner—Peter T. DiMauro
Attorney, Agent, or Firm—McAulay Fisher Nissen Goldberg & Kiel

[57] ABSTRACT

A process for the disposal of carbon dioxide in deep sea, which comprises compressing and dehumidifying gaseous carbon dioxide to be disposed of, passing the so compressed carbon dioxide gas through a cold sea water region where a temperature condition enough to liquefy the compressed carbon dioxide gas prevails via a pipe line to effect cooling of the gas by heat exchange with the cold sea water to thereby liquefy the compressed carbon dioxide gas, conducting the liquefied carbon dioxide through an extension of the pipe line to such a depth of sea water, that the specific weight of the liquefied carbon dioxide at such depth is greater than that of the ambient sea water of such depth, and then discharging out the liquefied carbon dioxide into such deep sea.

2 Claims, 4 Drawing Sheets

PROCESS FOR THE DISPOSAL OF CARBON DIOXIDE

This is a continuation of application Ser. No. 07/712,686, filed Jun. 10, 1991, now abandoned.

FIELD OF THE INVENTION AND RELATED ART STATEMENT

The present invention relates to a process for the disposal of carbon dioxide, in particular, in deep sea by liquefying gaseous carbon dioxide to be disposed of, contrived under a contemplation of contributing to the prevention of global environmental disorder, such as, climatic warming-up etc., due to increase in the carbon dioxide content in the atmosphere.

The content of carbon dioxide in the atmosphere has been increasing more and more due to the huge rate of free discharge of combustion gas into the atmosphere from various exhaust sources from combustion of fossil fuels, such as, petroleum and coal, in power plants, automobiles and factory firing units in the general industry, such as boiler plants etc. Thus, the problem of global climatic warming-up due to the so-called greenhouse effect resulting from increase in the carbon dioxide content in the atmosphere has been brought to the forefront in recent years.

Means have been proposed for preventing such increase in the content of carbon dioxide in the atmosphere by having recourse to a practical manner of disposal of carbon dioxide without discharging it into the atmosphere or to another way of disposal of carbon dioxide under recovery thereof from the atmosphere, such as follows:

a) Disposal of carbon dioxide is effected in open sea by dissolving it in sea water, wherein the $CO_2$-containing sea water has a specific weight greater than that of the ambient sea water having no content of $CO_2$, so that the sea water containing carbon dioxide will submerge to the sea bottom.

b) Disposal of carbon dioxide has recourse to the phenomenon that liquefied carbon dioxide has, under the condition of temperature and pressure prevailing in a deep sea of a depth of about 3,000 meters or more, a specific weight greater than that of the ambient sea water. Thus, gaseous carbon dioxide to be disposed of is liquefied in a compression station and the resulting liquid carbon dioxide is conducted to a depth of 3,000 m or more of deep sea to discharge it out into such deep sea.

However, the method a) above accompanies a fear that the sea water containing carbon dioxide may be subject to diffusion over a wide extent of sea water by the natural sea flow and may affect the ecological system of marine organisms.

The method b) above has a disadvantage that a liquefying apparatus and power therefor are required for the liquefaction of gaseous carbon dioxide, beside the necessity of additional power and installations for transporting and heat-insulating the liquefied carbon dioxide.

OBJECT AND SUMMARY OF THE INVENTION

In view of the stand of the technique explained above, the present invention has been achieved with the object of providing a means for realizing an economical and safe disposal of gaseous carbon dioxide originated from combustion gas from various exhaust sources or recovered from the atmosphere without suffering from any fear of diffusion of carbon dioxide over a wide extent of open sea.

Thus, there is provided according to the present invention a process for the disposal of carbon dioxide in deep sea, which comprises compressing and dehumidifying gaseous carbon dioxide to be disposed of, passing the so compressed carbon dioxide gas through a cold sea water region where a temperature condition enough to liquefy the compressed carbon dioxide gas prevails via a pipe line to effect cooling of the gas by heat exchange with the cold sea water to thereby liquefy the compressed carbon dioxide gas, conducting the liquefied carbon dioxide through an extension of the pipe line to such a depth of sea water, that the specific weight of the liquefied carbon dioxide at such depth is higher than that of the ambient sea water of such depth, and then discharging out the liquefied carbon dioxide into such deep sea.

Gaseous carbon dioxide liquefies under the condition of temperature and pressure corresponding to the liquid/gas equillibrium curve as shown in the diagram of FIG. 1. By the present invention therefore, it is contemplated to realize such a condition for liquefying gaseous carbon dioxide by making use of cold sea water to cool the gaseous carbon dioxide by flowing it in a pipe line through a cold sea water region under compression of the carbon dioxide Gas up to a pressure enough to liquefy it at the temperature of such cold water. The gaseous carbon dioxide conducted through the cold sea water region in the pipe line is cooled by heat exchange with the ambient cold sea water through the pipe wall and begins to liquefy.

According to the present invention, the flow of compressed carbon dioxide is dehumidified, in order to avoid possible formation of crystalline carbon dioxide hydrate under such a condition of temperature and pressure, which may cause clogging of the pipe line, and in order to prevent attack of the inside surfaces of the pipe line by carbonic acid formed from carbon dioxide and water, namely, dew or mist condensed from the moisture.

The pipe line for conducting the carbon dioxide to be disposed of is laid down on and along the sea bottom up to an extension reaching to such a depth that the specific weight of the liquefied corbon dioxide filled in the pipe line at this depth will be greater than that of sea water at this depth due to compression by the increased pressure head by the own weight of the liquid carbon dioxide. Therefore, the discharge outlet of the pipe line may be located, in general, at a depth of about 3,200 meters or more from the sea level.

According to the present invention, therefore, gaseous carbon dioxide to be disposed of is guided in a pipe line with compression through a cold sea water region so as to effect cooling thereof by the cold sea water by heat exchange therewith, wherein the gas is liquefied at a relatively shallow depth in the sea and the so liquefied carbon dioxide is then further guided to such a depth of the sea that the specific weight of the so pressurized liquid carbon dioxide is greater than that of the ambient sea water of such depth, while the liquid carbon dioxide is subjected to a spontaneous pressure increase due to the increase in the pressure head by the own weight of the liquid carbon dioxide. The pressurized liquid carbon dioxide is discharged out into the deep sea from the outlet of the pipe line. Due to the greater specific weight of the liquid carbon dioxide discharged out of the pipe line than that of the ambient sea water, it submerges to the bottom of the sea.

By the process according to the present invention, a safe and economical disposal of gaseous carbon dioxide originated from various combustion gas exhaust sources in a deep sea of a depth of about 3,200 meters or more can be realized without relying upon employment of an apparatus for liquefying the gaseous carbon dioxide with corresponding large power consumption in a special compression station installed on the land.

The process according to the present invention can afford to realize continuous and large scale disposal of gaseous carbon dioxide.

DETAILED DESCRIPTION OF PREFERRED EMBODIMENTS

Below, the process according to the present invention will be described by way of an embodiment with reference to the appended FIGS. 2, 3, 4, 5 and 6.

Figure 1:
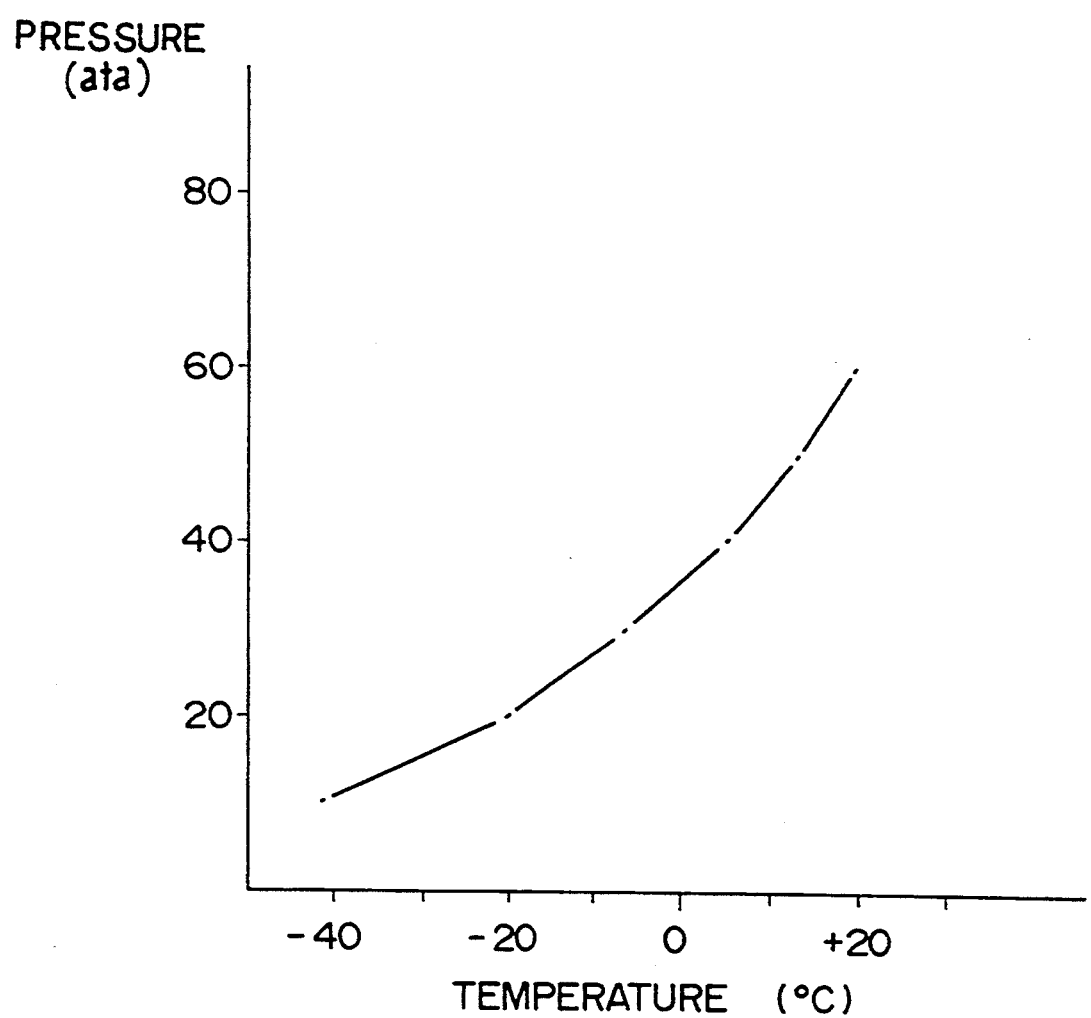
FIG. 1 is a pressure-temperature diagram for the liquid/gas equilibrium curve.
Figure 2:
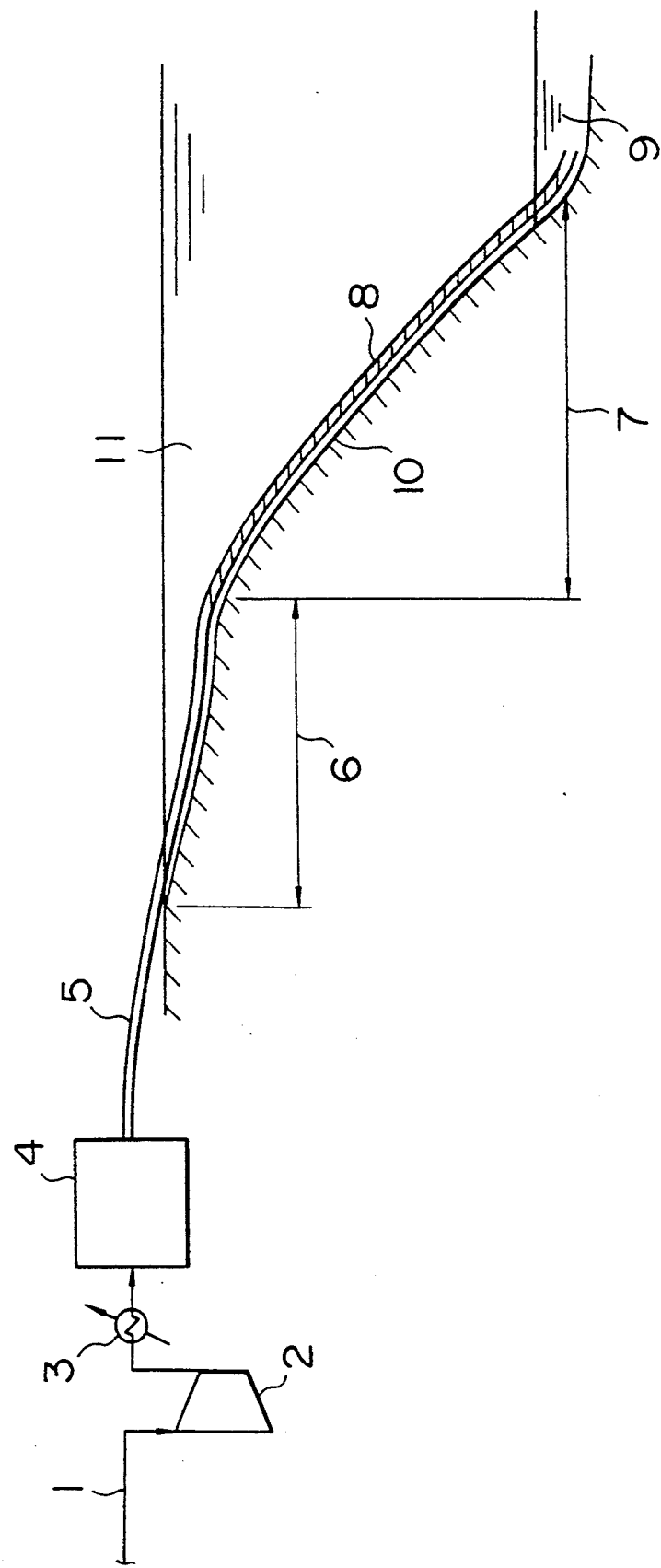
FIG. 2 is a schematic illustration of laying down of the pipe line along the sea bottom for realizing the process according to the present invention.
Figure 3:
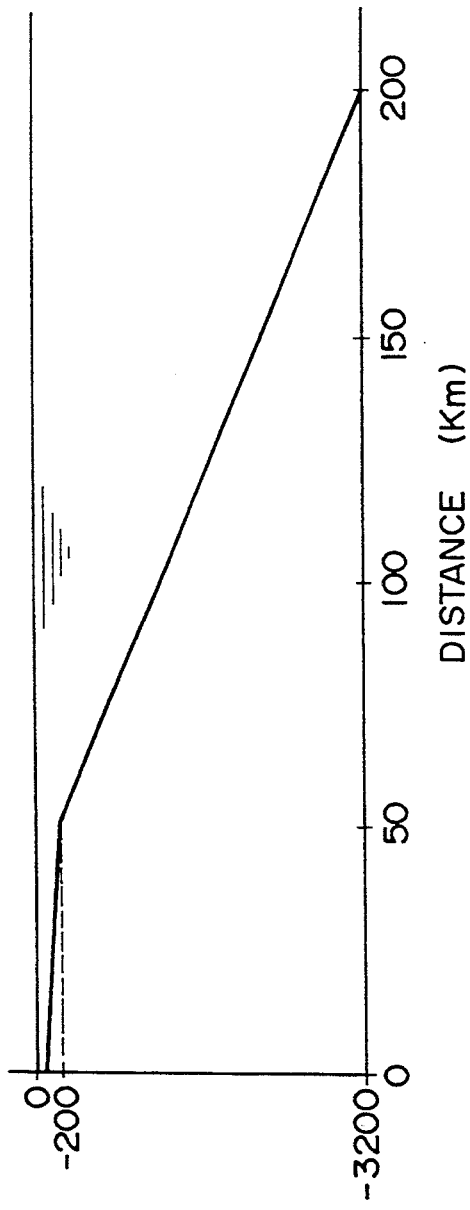
FIG. 3 shows an exemplary geographic profile of the sea bottom.

Refering now to FIG. 2, a flow of 245 tons per hour of gaseous carbon dioxide 1 to be disposed of is compressed in a compressor 2 up to a pressure of 50 ata. The compressed flow of gaseous carbon dioxide is cooled by a cooler 3 to a temperature of 40° C., whereupon it is dehumidified through a dehumidification unit 4 before being conducted to a pipe line 5. The pipe line 5 has an inner diameter of 16 inches and is laid down along the sea bottom up to a location of a depth of 3,200 meters from the sea level with a total extension of 200 km.

Figure 4:
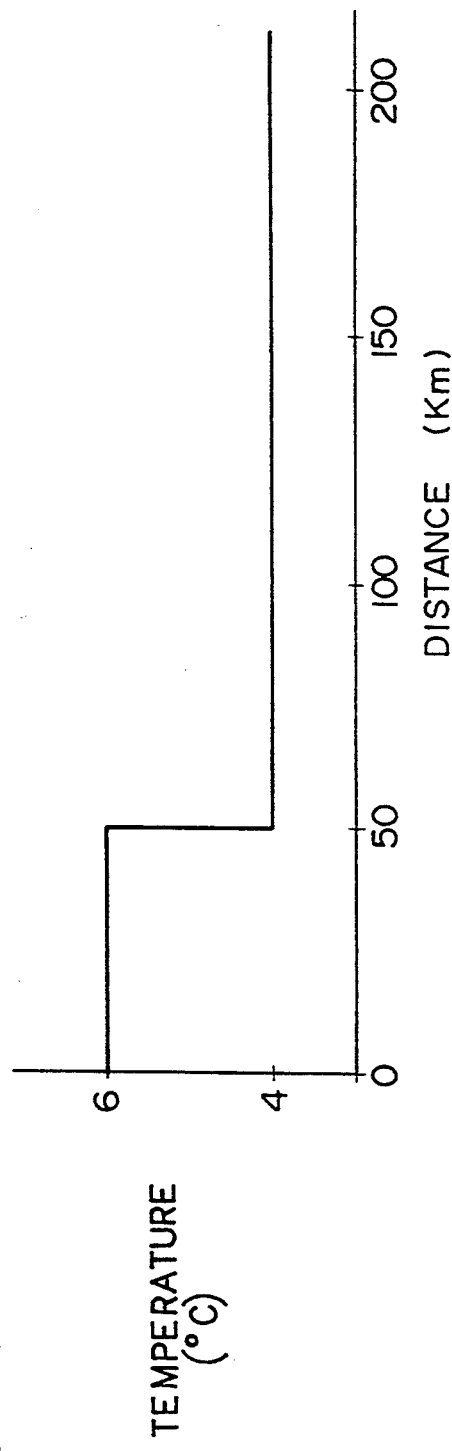
FIG. 4 shows the course of change of sea water temperature along the sea bottom in a simplified mode.

The geographic profile of the sea bottom 10 on which the pipe line is laid down descends gradually from the sea coast to a depth of 200 m over an extension of 50 km offfshore. The flow of carbon dioxide in the pipe line has been cooled enough at this location to begin to liquefy. From this 50 km offshore position, the sea bottom descends further to a depth of 3,200 m over a further extension of up to 200 km offshore. The interval 7 of this descent is served for guiding the liquefied carbon dioxide. The temperature profile along the sea bottom in this interval is as shown in FIG. 4, wherein the sea bettom temperature in the interval starting from the sea coast to the 50 km offshore portion over which the sea bottom depth changes from zero to 200 m and in which the pipe line laid down is served for cooling and liquefying the flow of carbon dioxide is 6° C. The temperature in the interval starting from the 50 km offshore portion to the 200 km offshore portion in which the pipe line laid down is served for guiding the liquefied carbon dioxide and in which the depth of the sea bottom changes from 200 m to 3,200 m is 4° C. (though a successive variation in the temperature of the sea water exists in practice, the temperature profile is represented for the sake of simplicity by the above two temperature stages).

The pipe line 5 is laid down on and along the sea bottom 10 without being embedded in the earth layer of the sea bottom so as to facilitate cooling of the flow of carbon dioxide in the pipe line 5 by heat exchange with the ambient sea water.

In the course of flow of carbon dioxide inside the pipe line 5, it is cooled by the ambient sea water 11 under heat exchange therewith to reach a temperature permitting liquefaction of gaseous carbon dioxide under the existing pressure and it begins to liquefy. During the course of liquefaction of the flow of carbon dioxide, the fow of carbon dioxide is maintained at nearly a constant temperature.

Figure 5:
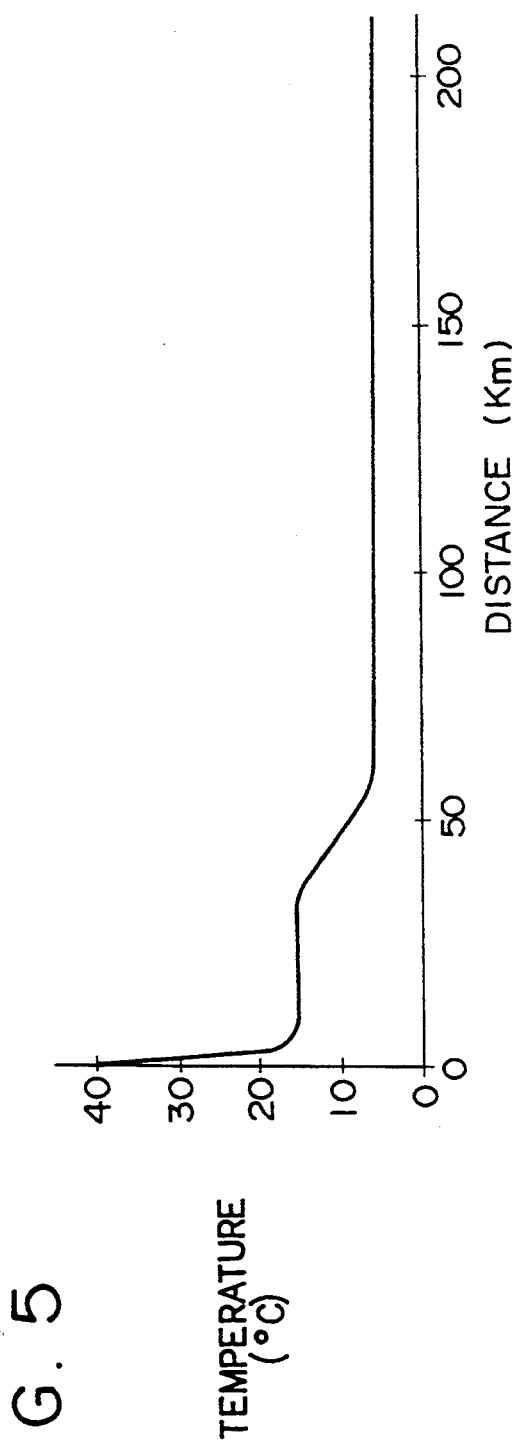
FIG. 5 shows a course of change of temperature of the flow of carbon dioxide in the pipe line along it according to an embodiment of the present invention.

The flow of carbon dioxide 8 which has been liquefied completely is then progressively cooled by the ambient sea water until it reaches the same temperature as the ambient sea water. The profile of variation of the temperature of the flow of carbon dioxide inside the pipe line 5 is shown in FIG. 5.

Figure 6:
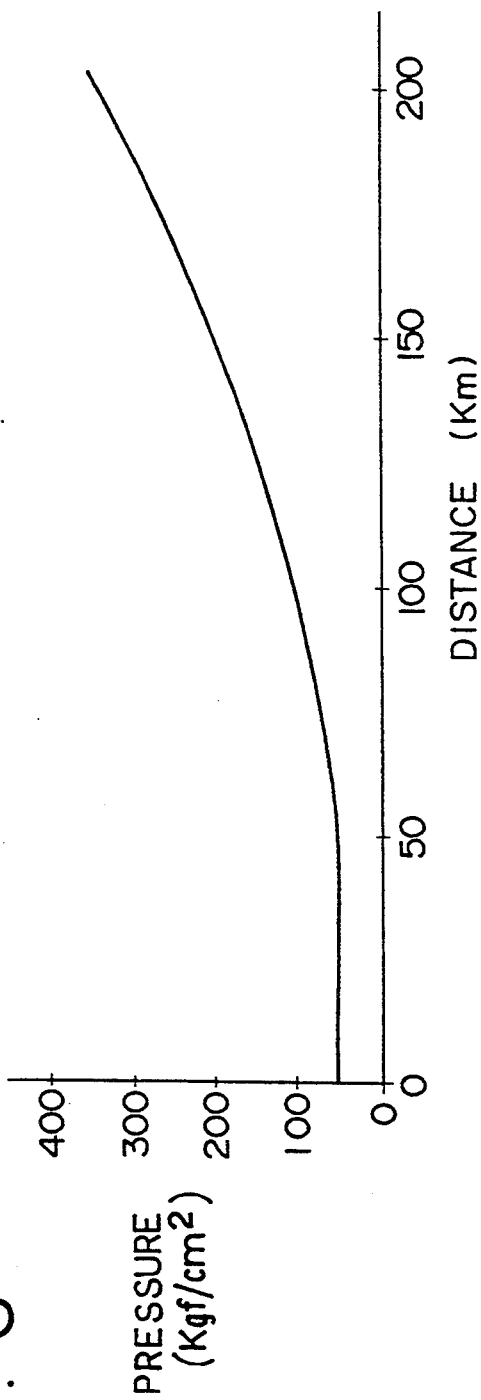
FIG. 6 shows a course of change of pressure of the flow of carbon dioxide along the pipe line according to an embodiment of the present invention.

The course of change of the pressure of carbon dioxide flowing inside the pipe line 5 is as shown in FIG. 6. Starting from the inlet pressure of 50 ata at the inlet of the pipe line 5, it increases during the course of liquefaction and during the passage through the deep sea in the pipe line 5, due to the increase in the pressure head by the own weight of the liquid carbon dioxide and will surpass the pressure of the sea water at a position where the depth is about 3,200 m.

Under the condition of pressure and temperature at the depth of 3,200 m, the specific weight of the so pressurized liquid carbon dioxide becomes greater than that of the sea water at such depth. The liquid carbon dioxide discharged out of the outlet of the pipe line 5 will thus submerge to the bottom 10 of the sea as shown by numeral 9.

We claim:

1. A process for the disposal of carbon dioxide in the deep sea comprising compressing and dehumidifying gaseous carbon dioxide to be disposed of, passing the thus compressed carbon dioxide gas via a pipeline extending through a cold seawater region to a point about 50 km offshore and a depth of about 200 m, the temperature conditions being such as to cool and liquefy the compressed carbon dioxide gas in the pipeline, conducting the thus liquefied carbon dioxide through a further extension of the pipeline up to about 200 km offshore to a depth of sea water from about 3,000 m or more and such that the specific weight of the liquefied carbon dioxide is greater than that of the ambient sea water at said depth, and then discharging the liquefied carbon dioxide into the sea at that depth.

2. The process of claim 1 wherein the gaseous carbon dioxide is compressed at the inlet of the pipe line up to about 50 ata.

* * * * *